United States Patent [19]

Terashima et al.

[11] Patent Number: 5,455,406
[45] Date of Patent: Oct. 3, 1995

[54] AUTOMATIC TRANSACTION APPARATUS

[75] Inventors: Hisashi Terashima, Tokyo; Emiko Tanaka, Owariasahi; Kanzen Goto, Aichi; Ryuichi Okamoto, Seto; Ikuyo Oda, Owariasahi, all of Japan

[73] Assignees: Hitachi, Ltd.; American Express International Inc., both of Tokyo, Japan

[21] Appl. No.: 164,416

[22] Filed: Dec. 9, 1993

[30] Foreign Application Priority Data

Dec. 15, 1992 [JP] Japan .................. 4-334126

[51] Int. Cl.⁶ .................................. G06K 9/00
[52] U.S. Cl. ............................. 235/379; 902/3
[58] Field of Search .................. 235/379; 902/3

[56] References Cited

U.S. PATENT DOCUMENTS

| | | | |
|---|---|---|---|
| 4,385,285 | 5/1983 | Horst et al. | 235/379 |
| 4,680,801 | 7/1987 | Etherington et al. | 902/3 |
| 5,023,782 | 6/1991 | Lutz et al. | 235/379 |
| 5,195,133 | 3/1993 | Kapp et al. | 235/379 |

FOREIGN PATENT DOCUMENTS

| | | |
|---|---|---|
| 0427562A1 | 5/1991 | European Pat. Off. . |
| 193860 | 11/1982 | Japan .................. 235/379 |
| 63-113796 | 7/1988 | Japan . |
| 64-8494 | 1/1989 | Japan . |
| WO91/10207 | 7/1991 | WIPO . |

OTHER PUBLICATIONS

"Kinyu Zaisei Jijo," No. 16, Jan. 1989, p. 83. (Japanese).

*Primary Examiner*—John Shepperd
*Attorney, Agent, or Firm*—Fay, Sharpe, Beall, Fagan, Minnich & McKee

[57] ABSTRACT

An automatic transaction apparatus for taking a transaction requiring the acquisition of a signature is provided with a mechanism for acquiring a signature. The signature acquisition mechanism includes a detector for detecting the execution of signature application. At the time of a signature acquisition processing, an advancement to the next processing step is taken when the execution of signature application is detected and information indicative of the completion of signature application is inputted. Thereby, the signature is surely recorded. The transaction requiring the acquisition of a signature includes a process for issuing a traveler's check.

16 Claims, 12 Drawing Sheets

FIG.7A

```
SIGNATURE

PLEASE WRITE YOUR SIGNATURE ON THE PAD

┌─────────────────────┐      ┌──────────────────┐
│ TOTAL               │      │                  │
│            US $*,***│      │ ILLUSTRATION     │
├─────────────────────┤      │ DISPLAY          │
│ EQUIVALENT          │      │ PORTION          │
│         ¥*,***,***  │      │                  │
└─────────────────────┘      └──────────────────┘

[REWRITE]  THEN PRESS [ENTER] KEY    [ENTER]
```

PAPER BEING CHANGED.
PLEASE WAIT A MOMENT.

FIG.7C

ILLUSTRATION A 93

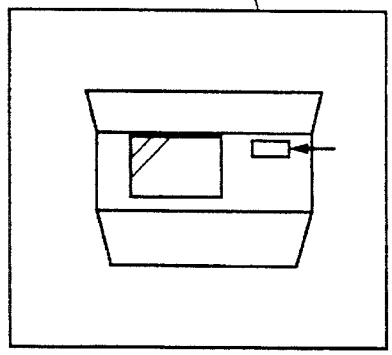

FIG.7D

ILLUSTRATION B 94

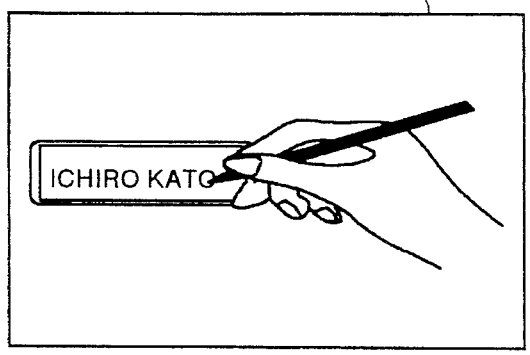

_AUTOMATIC TRANSACTION APPARATUS_

BACKGROUND OF THE INVENTION

The present invention relates a technique in which a procedure for transactions including a processing of a signature application or an impression for the identification of a user (or a signature acquisition processing) in procedures for transactions in banks or the like is performed without troubling a clerk in charge in the banks or the like, and more particularly to an apparatus for automatically issuing a traveler's check by a user's operation.

Conventionally, in the case where a traveler's check (TC) is to be purchased in a banking organ such as a bank or the like, a purchaser (or customer) makes the entry of predetermined matters in an exchange request sheet prepared in the banking organ and the banking organ receives the entered exchange request sheet from the customer so that the employes of the banking organ perform processings including the conversion into a market quotation and the calculation of a commission based on the exchange request sheet, the delivery of traveler's checks to the customer and the adjustment of charge. There is known a technique in which such a complicated procedure is automated so that the confirmation of the kind and the number of traveler's checks, a charge settlement processing and so on are performed by an automatic transaction apparatus.

This kind of technique has been disclosed by, for example, "Kinyu Zaisei Jijo", No. 16, p. 83, Jan. 1989.

On the other hand, in the case where a traveler's check is to be issued, it is necessary that the signature of a traveler's check purchaser is recorded and preserved in an issuing banking organ. Therefore, after receiving the traveler's check from an automatic transaction apparatus, a customer performs a signature application registration processing at a window at which an employee of the banking organ attends. Accordingly, in the above-mentioned prior art, a window service processing must be performed for a signature acquisition processing, which makes impossible to fully perform a traveler's check issuing process by the automatic transaction apparatus.

JP-A-63-113796 has disclosed a technique in which a season ticket issuing system is provided with handwriting input means such as a tablet so that handwritten information is outputted in a form printed on a season ticket to be issued.

In this technique, however, no signature is left to a season ticket issuer. Also, since the input is made to the tablet, the accurate acquisition of a signature is difficult and the cost of the automatic transaction apparatus becomes high.

JP-A-64-8494 has disclosed an automatic transaction apparatus in which a signature section for applying and impressing a signature, a sheet supply section for supplying a registration sheet to the signature section, a receiver section for receiving and preserving the signature applied or impressed registration sheet and a guidance display section for making a guidance in the working procedure of a signature applying/impressing work are provided in order to automatic a clerical procedure for the new opening of an account with a banking organ or the like.

In this technique, however, no sufficient consideration is taken as to the forgetting of acquisition of signature application or impression or the prevention of signature application or impression from being forgot is made by a user's depression of an acknowledge key.

Accordingly, there may occur a situation in which a user unaccustomed to the operation of an automatic transaction apparatus forgets to apply a signature or stamp a seal. Also, there may be allowed a situation in which a user does not apply or impress a signature intentionally in order to accomplish any unjust utilization.

SUMMARY OF THE INVENTION

An object of the present invention made for solving the above problems is to provide an automatic transaction apparatus in which the signature of a purchaser can be acquired reliably in a traveler's check purchasing procedure, a problem of troubling a clerk in charge of a banking organ to issue traveler's checks is suppressed to the minimum and the traveler's check purchasing procedure is advanced by only the purchaser.

To attain the above object, the present invention provides an automatic transaction apparatus for taking a transaction requiring the acquisition of a signature, comprising signature acquiring means for acquiring the signature of an operator, detecting means for detecting the execution of an operation to the signature acquiring means, and control means for advancing a transaction process in accordance with a predetermined procedure so that at the time of a signature acquisition processing, an advancement to the next processing is taken under the condition that the execution of the signature acquisition operation to the signature acquiring means is detected by the detecting means.

In the case where the signature acquisition processing is to be performed in the course of a traveler's check issuing process, a shutter mechanism provided in the signature acquiring means is opened to enable the application of a signature to a journal. After the signature acquisition processing is completed, another transaction record information is printed on the journal and the journal is wound or taken up by a length corresponding to one time of transaction to provide for the next signature acquisition processing.

In the case where the signature acquisition operation to the signature acquiring means is not detected by the detecting means, the advancement to the next processing is not made, thereby eliminating a fear that the transaction is completed forgetting to acquiring a signature, which is effective for the normal settlement of the transaction.

BRIEF DESCRIPTION OF THE DRAWINGS

FIGS. 7A and 7B are views showing examples of a customer conducting guidance on a display screen;

FIGS. 7C and 7D are views showing illustrations displayed in an illustration display portion on the customer conducting display screen shown in FIG. 7a.

DESCRIPTION OF THE PREFERRED EMBODIMENTS

Figure 1:
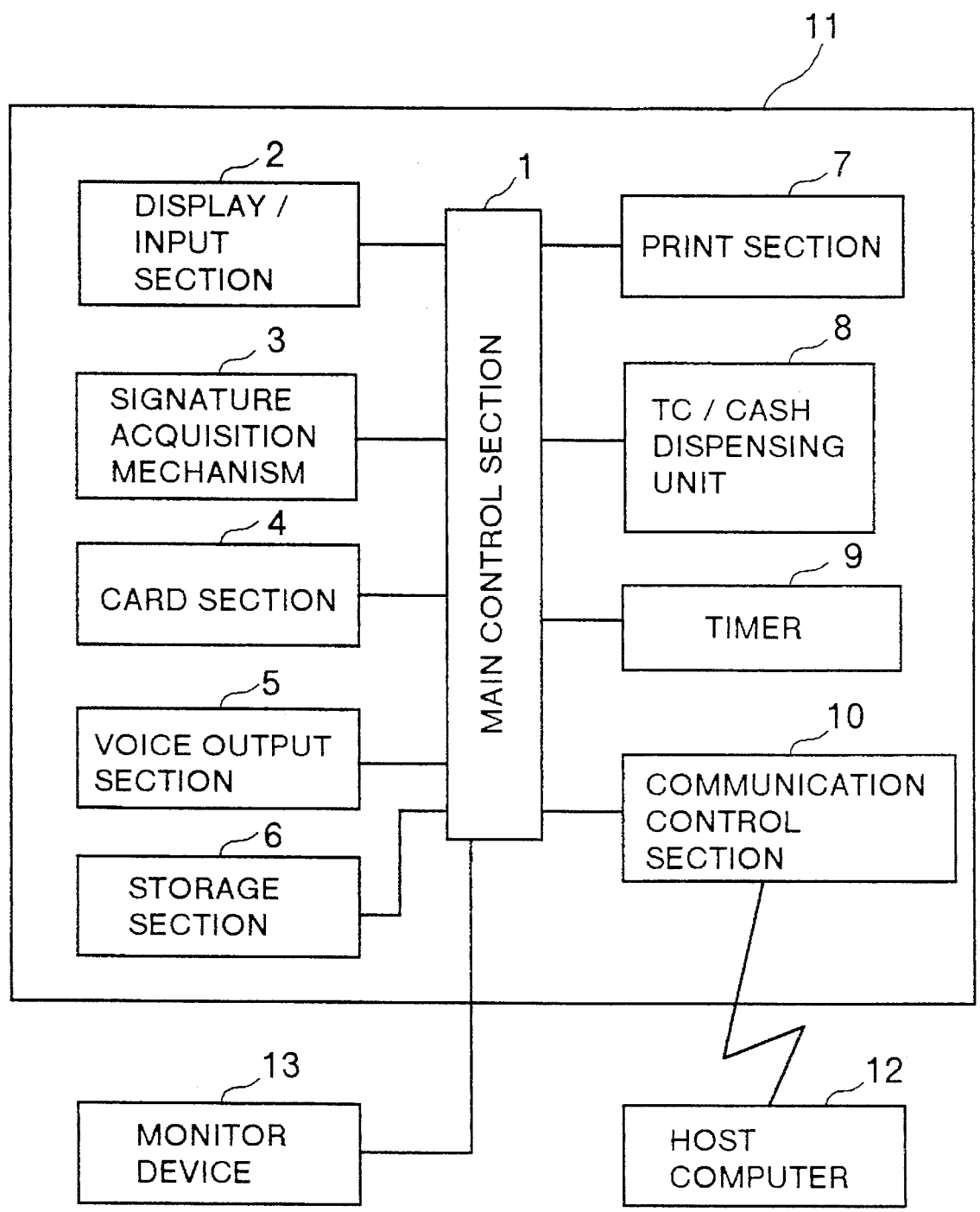
FIG. 1 is a block diagram of an automatic transaction apparatus according to an embodiment of the present invention.
Figure 2:
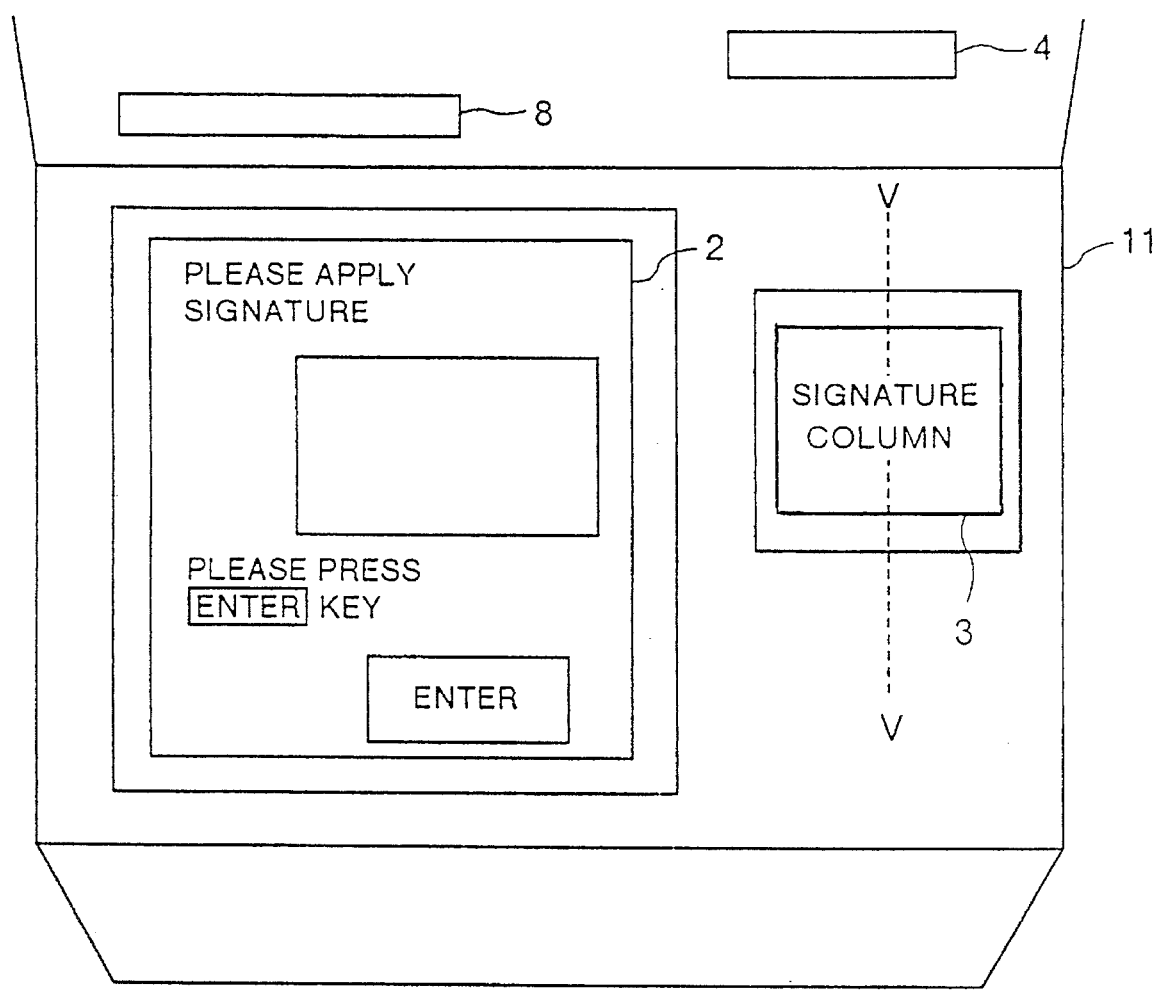
FIG. 2 is a view showing the external appearance of a part of a front face of the automatic transaction apparatus.

In FIGS. 1 and 2 showing an embodiment of the present invention, reference numeral 11 denotes an automatic transaction apparatus for a traveler's check (TC). The automatic transaction apparatus 11 includes a display/input section 2, a signature acquisition mechanism 3, a card section 4, a voice output section 5, a storage section 6, a print section 7, a cash input/output and TC/cash dispensing unit 8, a timer 9 and a communication control section 10. The automatic transaction apparatus 11 is connected to a host computer 12 through the communication control section 10.

The display/input section 2 is a display device provided with a touch panel as input means. The display/input section 2 makes a display for guiding an operator in the operation of the automatic transaction apparatus. Also, the operator can input necessary information to the display/input section 2 by depressing the touch panel in accordance with the contents displayed on the display device.

Figure 5:
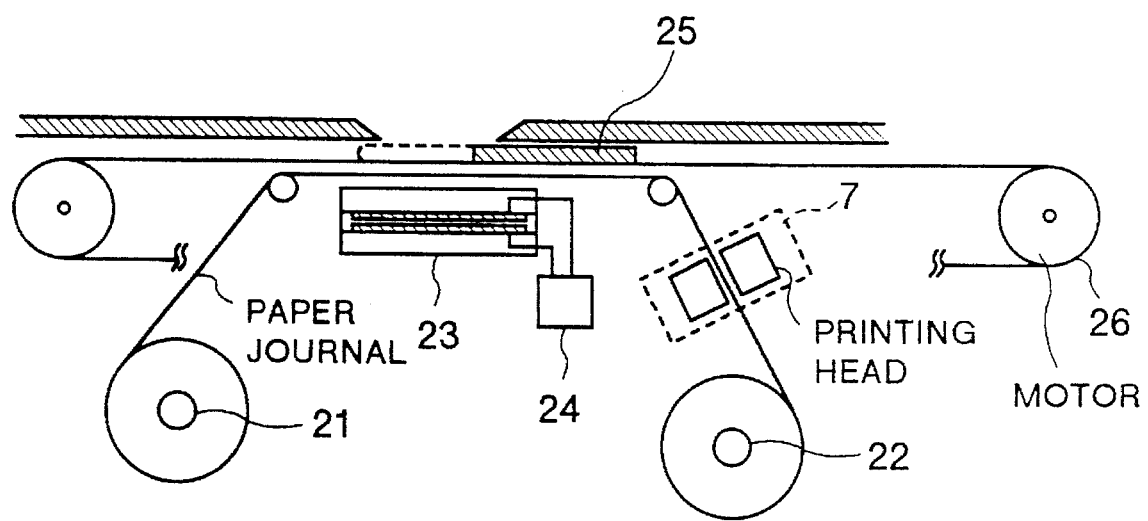
FIG. 5 is a cross section of a signature acquisition mechanism taken along line V—V in FIG. 2.
Figure 6:
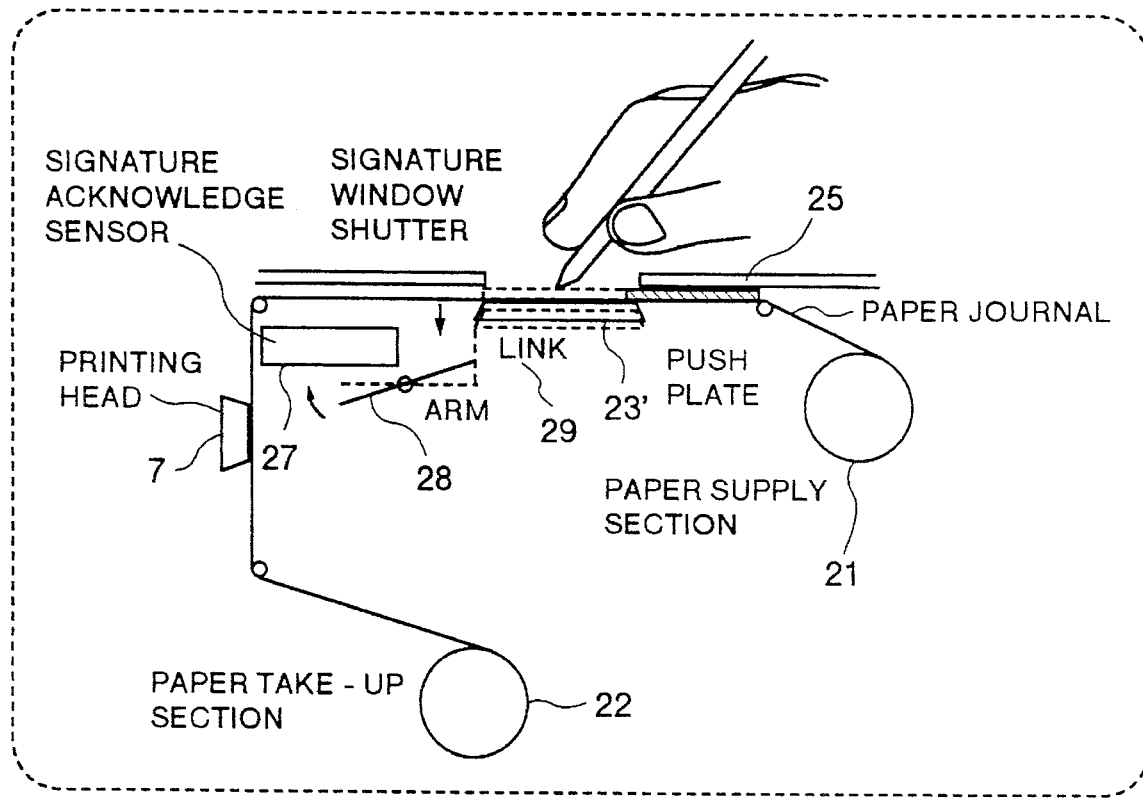
FIG. 6 is a view showing another example of the signature acquisition mechanism.
Figure 6A:
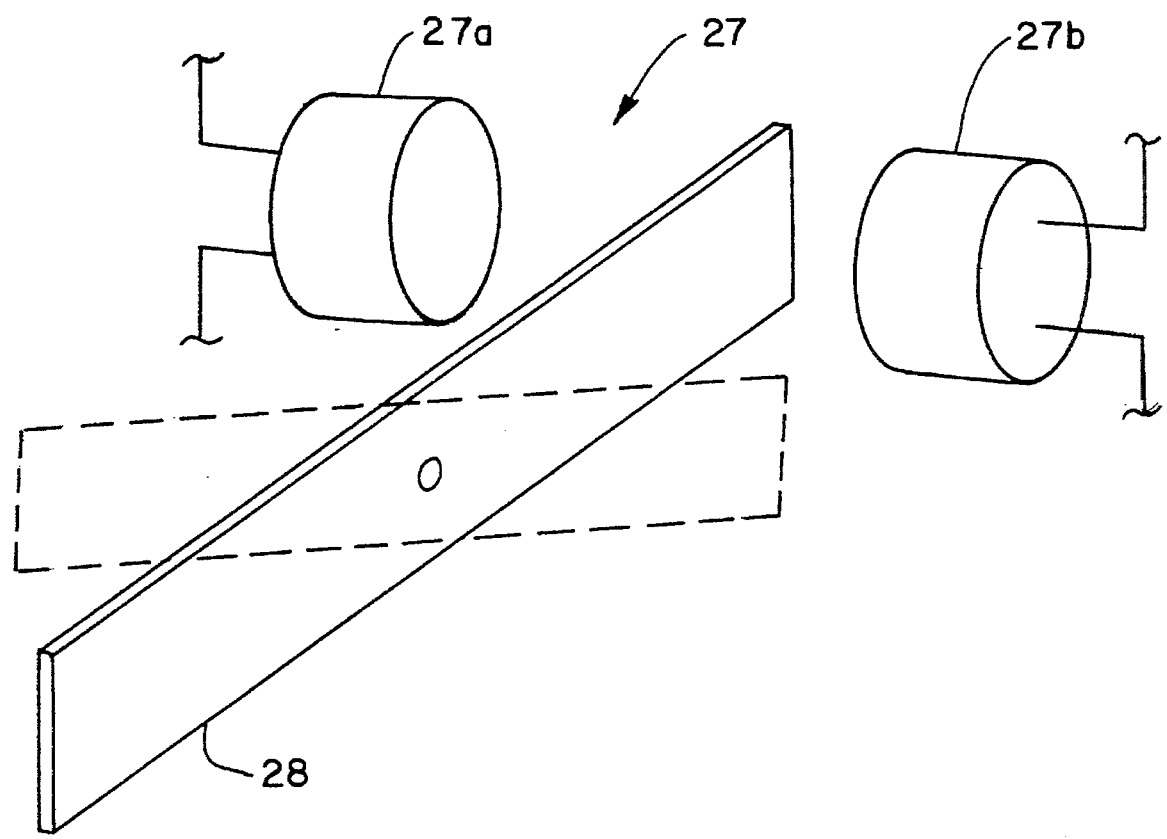
FIG. 6A shows a schematic diagram of a signature acknowledge sensor in FIG. 6.
Figure 8A:
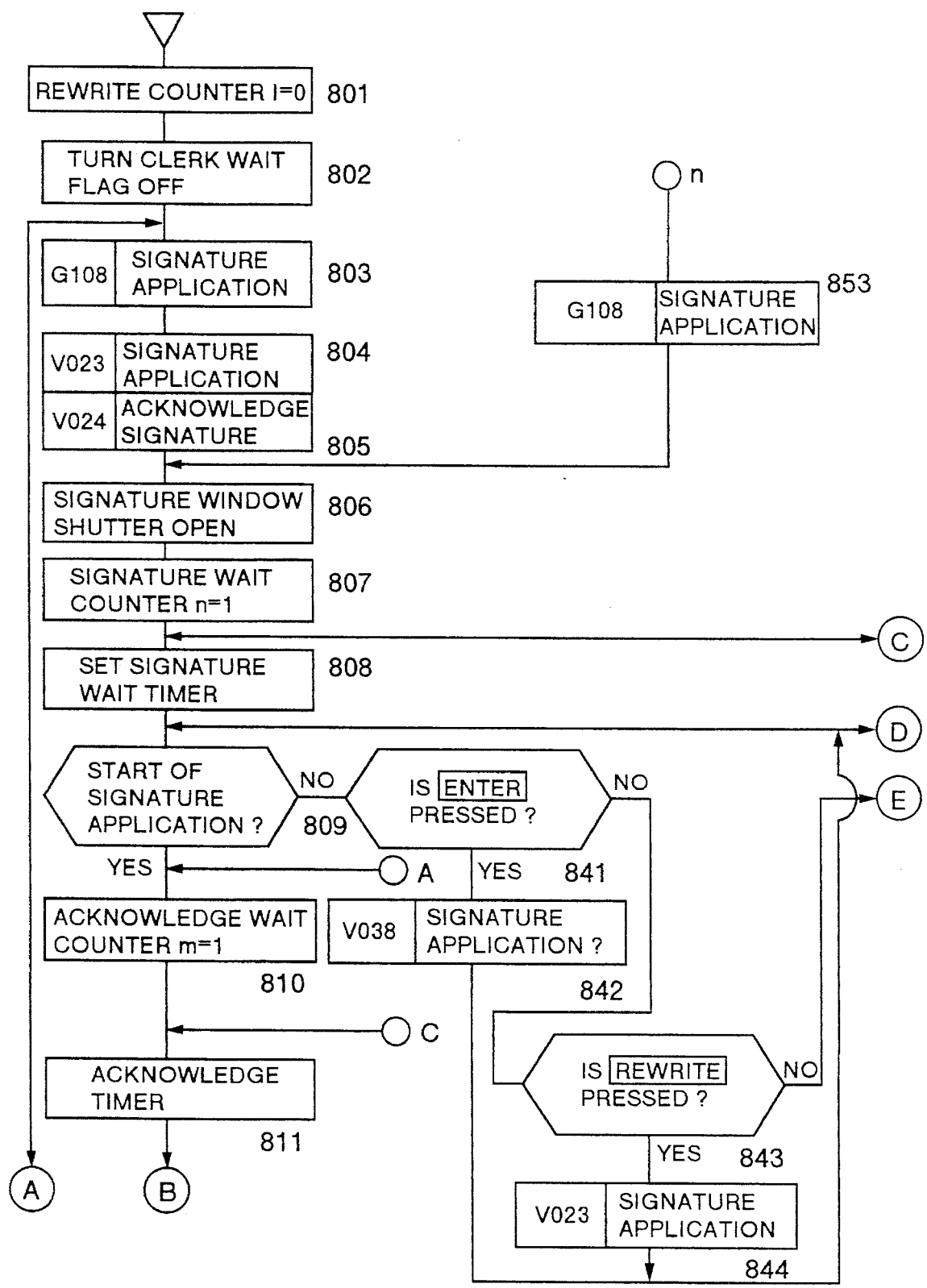
FIGS. 8A to 8D are flow charts showing the details of processings performed by the automatic transaction apparatus.
Figure 8B:
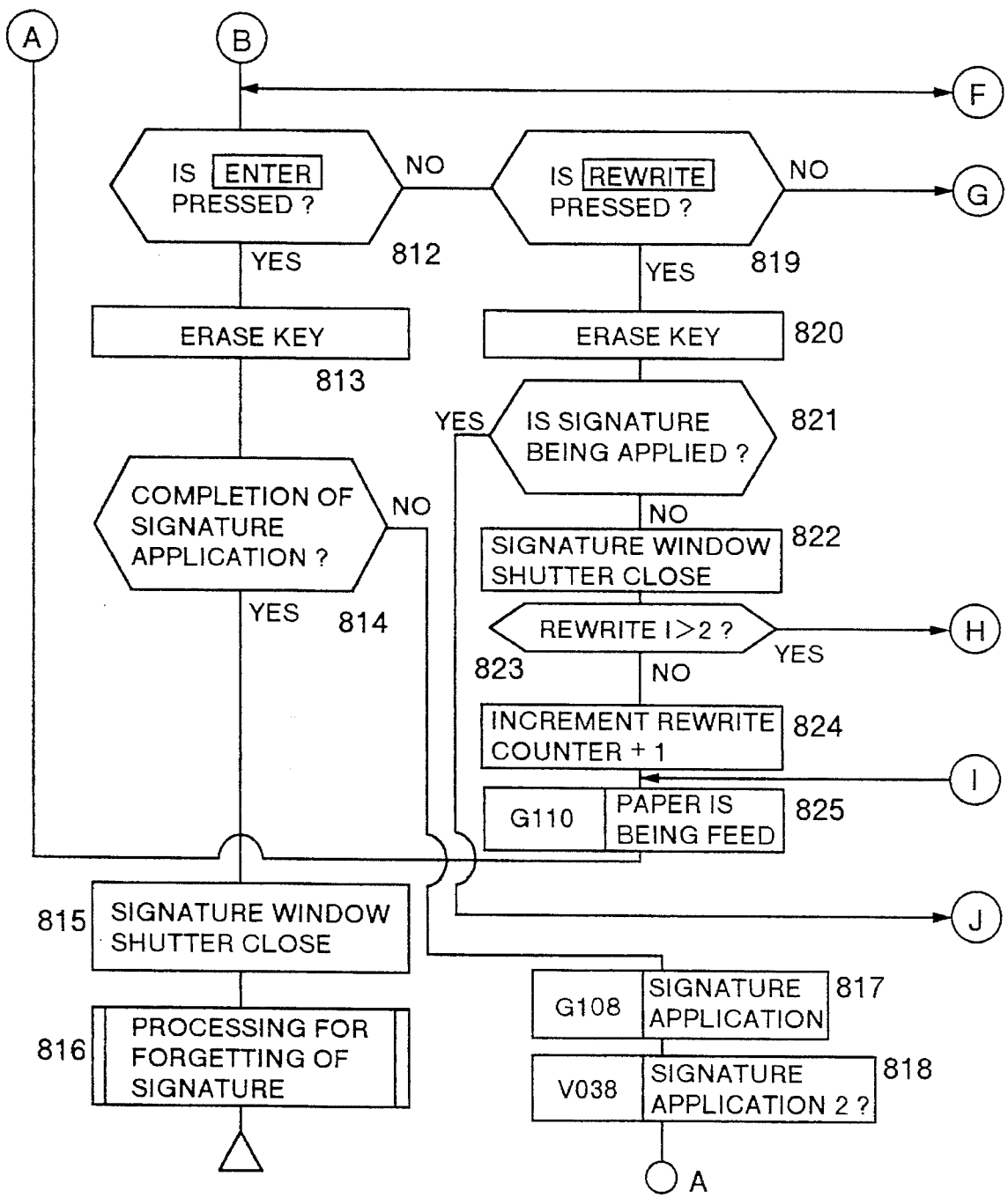
Figure 8C:
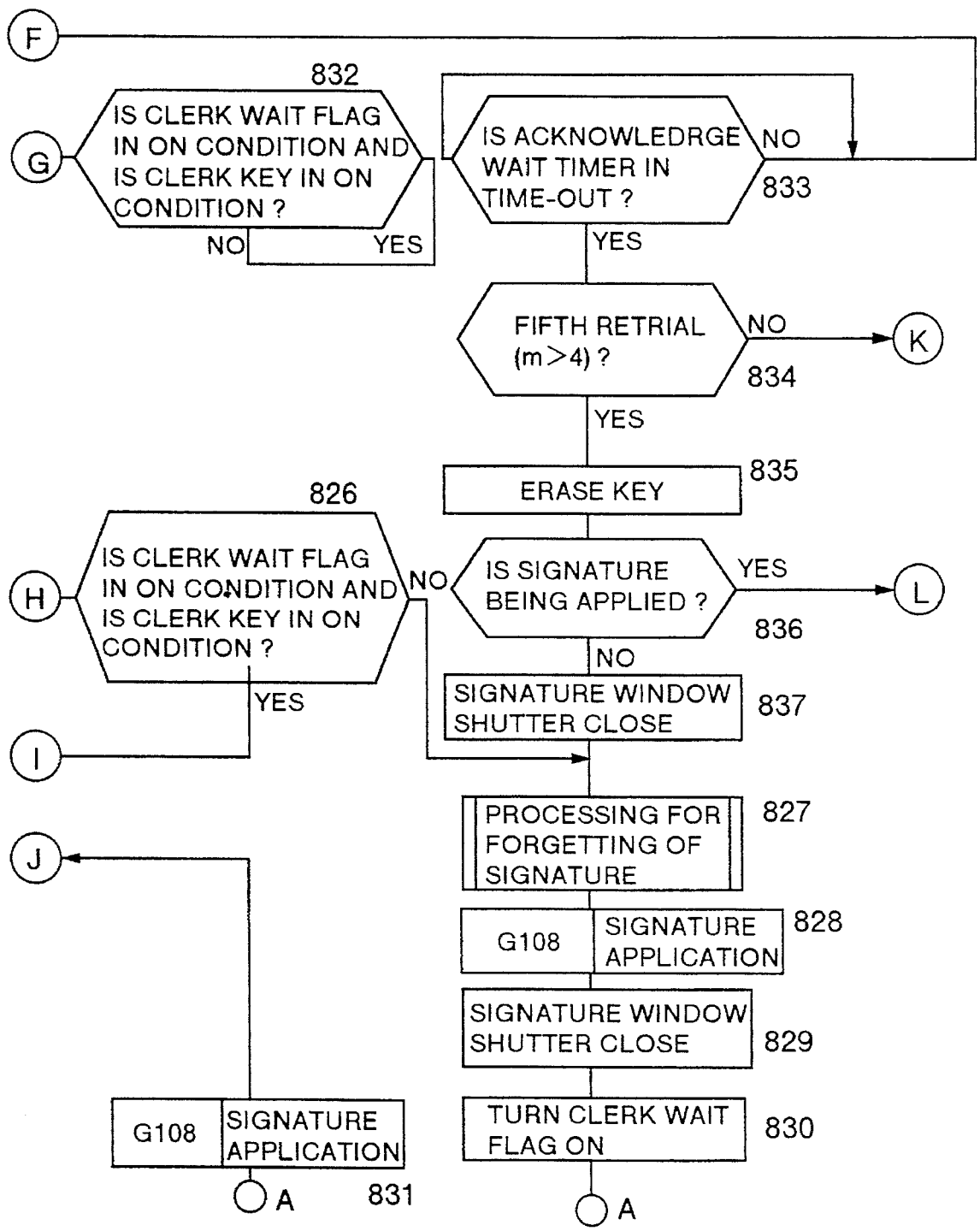
Figure 8D:
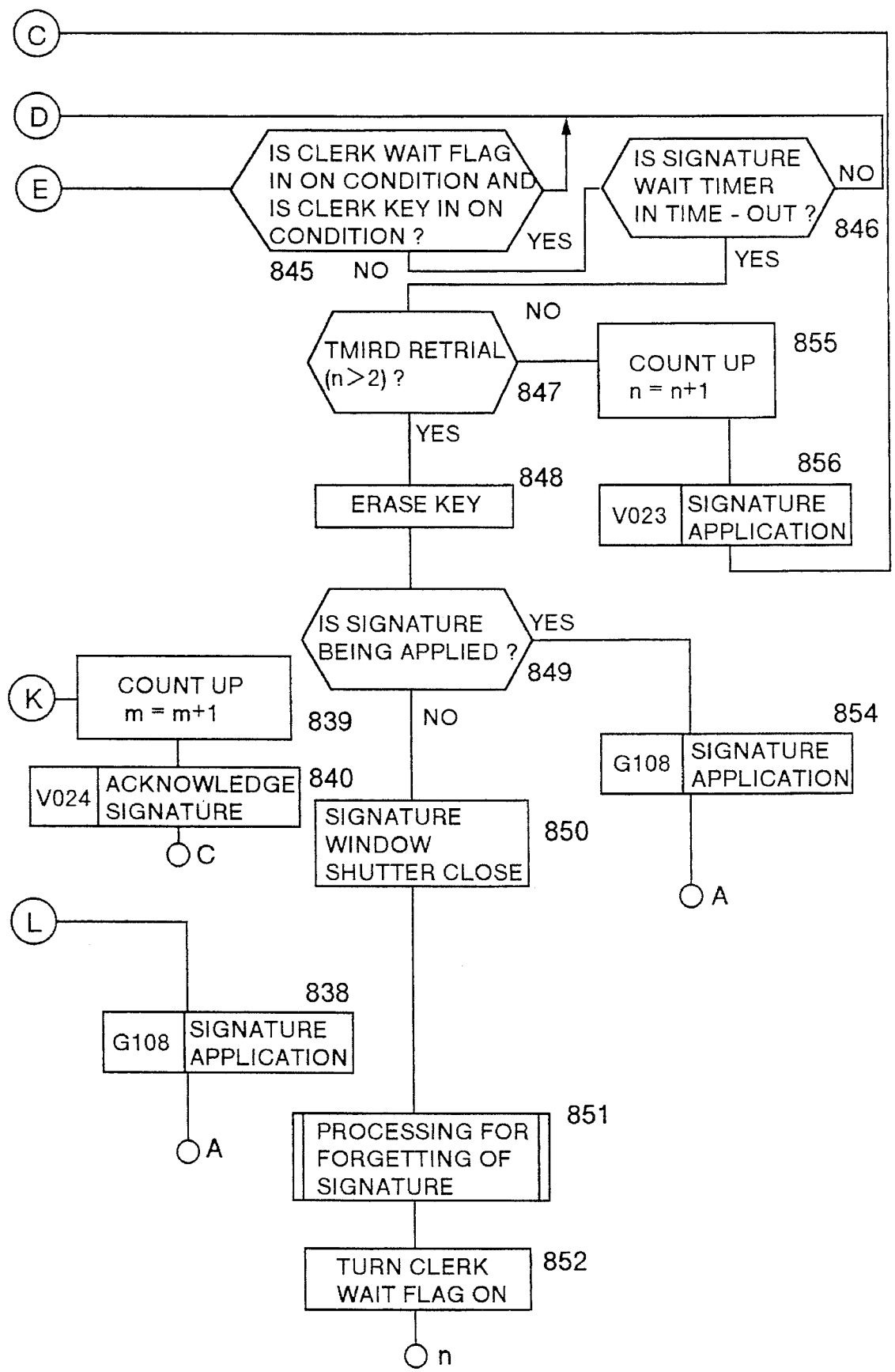

The signature acquisition mechanism 3 is a section where a signature is applied by the operator. The details of the signature acquisition mechanism 3 are shown in FIG. 5 or 6.

The card section 4 performs the input/output of a magnetic card and the issuance of a specification. For example, the adjustment of charges is to be made by the pulling-down from the account in a bank, the card section 4 reads information from the magnetic card and sends the read information to the upper or host device for processing.

The voice output section 5 outputs a voice when it is requested to guide or conduct a customer by the voice.

The storage section 6 performs the recording of information and the reading of information.

The cash input/output and TC/cash dispensing unit 8 performs the issuance of TC, the input/output of cash at the settlement of charges, and so on.

The timer 9 counts a time in order to monitor the time of operation by the operator and set forth.

The automatic transaction apparatus 11 is further connected to a monitor device 13. When a processing by a clerk in charge such as a bank clerk is necessary, the monitor device 13 receives a signal from the automatic transaction apparatus 11 to call the clerk in charge.

A main control section 1 controls the above-mentioned sections.

FIG. 5 is a cross section of the signature acquisition mechanism 3 taken along line V—V in FIG. 2. In FIG. 5, reference numeral 21 denotes a paper journal mounting section for mounting a roll-like paper journal, numeral 22 a signed paper journal take-up or winding section, numeral 23 a table for signature application, and numeral 24 a depression detecting section associated with the table 23. The depression detecting section 24 is provided, for example, with upper and lower surfaces made of conductive rubber to detect a depression pressure by detecting an electrical conduction when the upper and lower conductive rubbers contact each other through a signature applying work using a pen. The pressure detection information is transmitted to the main control section 1. Transaction information (for example, the kind of TC, the amount of money, the date of transaction, the instant of time) other than the signature is printed on the paper journal by the print section 7 under control by the main control section 1 and is left as a record. Thereafter, the signed paper journal take-up section 22 takes up the paper journal by a length corresponding to one time of transaction. Numeral 25 denotes a shutter mechanism. Under control by the main control section 1, the shutter mechanism 25 is opened when a step for signature acquisition is to be taken and is closed when the transaction is completed.

FIG. 6 shows another example of the signature acquisition mechanism 3. In FIG. 6, reference numeral 27 denotes a signature acknowledge sensor. When an operator applies a signature at the time of signature application, a push plate 23' of the signature acquisition mechanism is lowered due to a pen pressure and a link 29 connected to the push plate 23' is lowered corresponding to the movement of the push plate 23'. As a result, one end of an arm 28 having the other end connected to the link 29 and an intermediate portion with one location thereof fixed is raised so that the signature acknowledge sensor 27 is turned on. The signature acknowledge sensor 27 includes a light sensor composed of a light emitting element 27a and 27b and a light receiving element and detects whether or not a signature is being applied in accordance with whether or not the arm 28 enters between the light emitting element 27a and 27b and the light receiving element to intercept light. When the signature application is completed, transaction information (for example, the kind of TC, the amount of money, the date of transaction, the instant of time) other than the signature is printed on a paper journal by a printing head 7 and is left as a record. Thereafter, the signed paper journal take-up section 22 takes up the paper journal by a length corresponding to one time of transaction.

Figure 3:
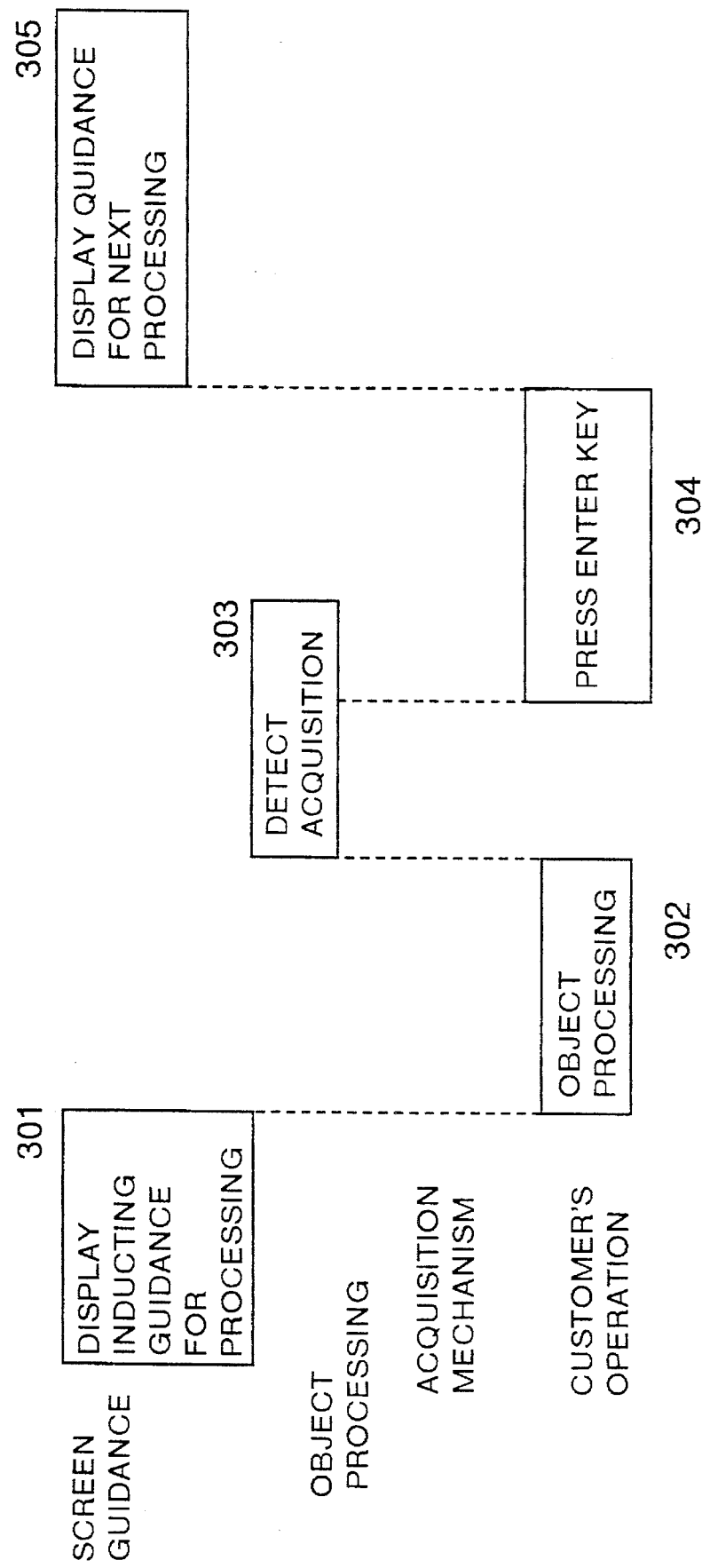
FIG. 3 is a flow chart showing the outline of a signature acquisition processing in the automatic transaction apparatus.

FIG. 3 shows the automatic transaction apparatus 11 at the time of a signature acquisition processing and the outline of the flow of a processing performed by a customer's operation.

The automatic transaction apparatus 11 displays an operator conducting guidance for a transaction process on the display screen of the display/input section 2 (301). An operator advances the processing in accordance with the displayed conducting guidance so that the operator applies a signature for the signature acquisition mechanism 3 by use of writing goods such as ballpoint pen or fountain pen used for signature application when the operator is conducted to apply the signature (302). When the signature is applied by the operator, the depression pressure detecting section of the signature acquisition mechanism 3 detects the signature acquisition (303). The automatic transaction apparatus 11 conducts the operator to press an enter key indicative of the completion of the signature acquisition processing and displays a guidance for the next processing (305) when the enter key is pressed by the operator (304).

Figure 4:
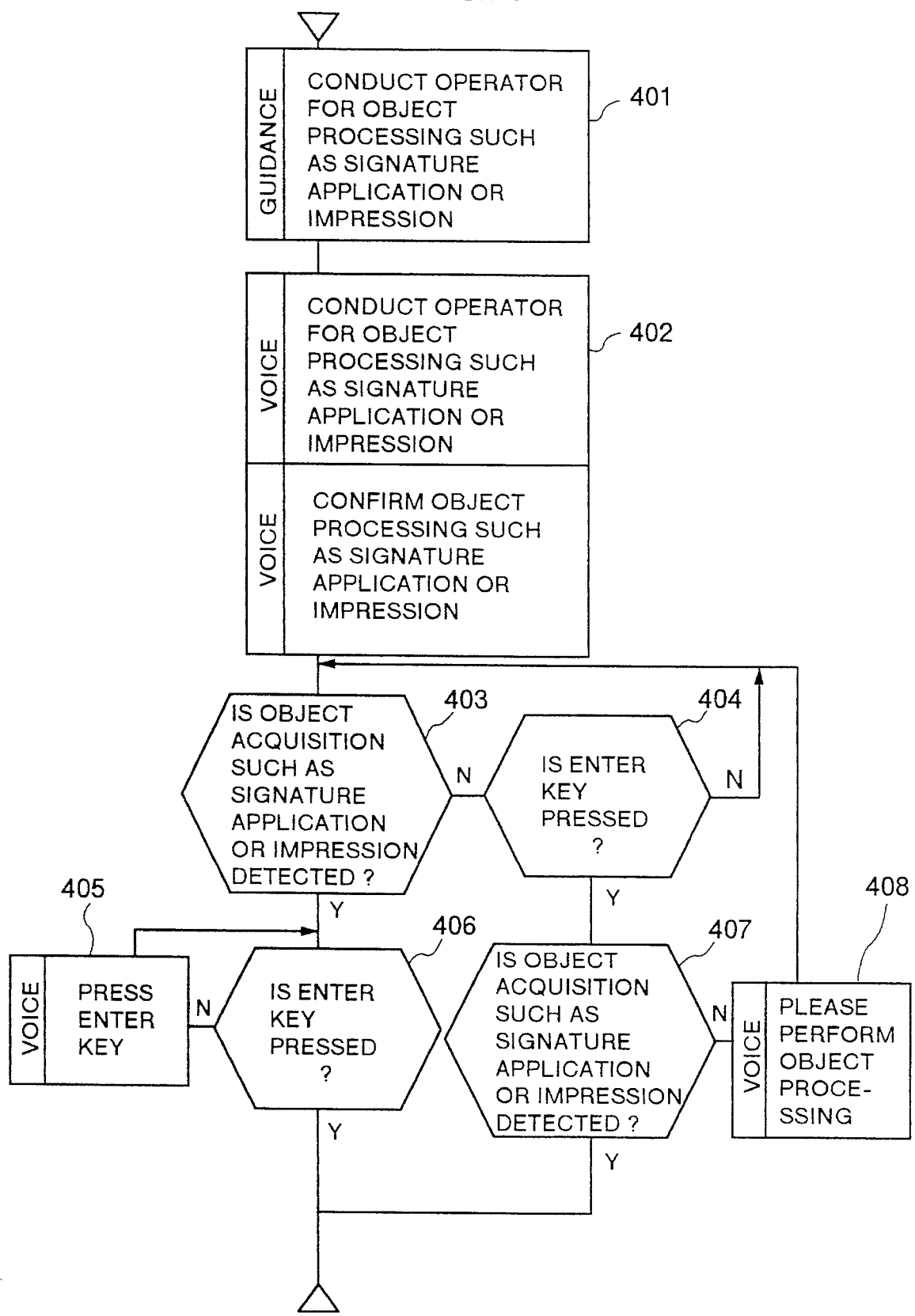
FIG. 4 is a flow chart showing a processing performed by the automatic transaction apparatus at the time of the signature acquisition processing.

FIG. 4 is a flow chart showing a processing performed by the automatic transaction apparatus 11 at the time of a signature acquisition processing. The automatic transaction apparatus 11 for TC advances an automatic TC issuing process which includes the display of the exchange rate of the dollar, the kind of TC, the input of the amount of money, a guidance of a processing for the settlement of transaction sum inclusive of a commission, and so on. When a signature acquisition processing is to be performed, the shutter mechanism 25 of the signature acquisition mechanism 3 is opened. The opening/closing of the shutter mechanism 3 is made, for example, by fixing a shutter to a belt with one end of the belt fixed to a motor and with the other end thereof fixed to a rotatable stopper and controlling the direction of rotation of the motor by the main control section 1. Simultaneously with the opening of the shutter, a guidance for signature acquisition processing such as a screen display example shown by 91 in FIG. 7A is displayed (step 401). FIGS. 7B and 7D show examples 93 and 94 of an illustration displayed in an illustration display portion 95 on a display screen at the time of signature acquisition. The illustrations A 93 and B 94 are alternately and repeatedly displayed in the illustration display portion 95 of the display/input section 2 to effectively conduct an operator. The illustrations shown by way of example represent a signature applying method (illustration B 94) and the position of a signature applying mechanism in the apparatus (illustration A 93). While the screen guidance is displayed on the display/input section 2, a voice guidance is given by a voice to conduct the operator for a signature application processing (step 402). An example of the voice guidance may be "PLEASE APPLY SIGNATURE. AND, PLEASE PRESS ENTER KEY".

In the case where the acquisition of a signature or the like is detected by the pressure detecting section 24 of the signature acquisition mechanism 3 (step 403) and the enter key is depressed (step 406), the completion of the signature acquisition processing is determined and the flow proceeds to the next processing step for automatic TC transaction.

After the detection of signature acquisition by the pressure detecting section 24 of the signature acquisition mechanism 3 in step 403, the time is monitored by the timer 9. In the case where the input of the enter key is not made in a fixed time, the operator is urged to press the enter key by giving a voice guidance such as "PLEASE PRESS ENTER KEY" (step 405).

In the case where the acknowledge key is depressed (step 404) notwithstanding that no signature acquisition is detected in step 403, a wait of a fixed time is taken for the detection of signature acquisition. If the signature acquisition is detected in the fixed time (step 407), the completion of the signature acquisition processing is determined and the flow proceeds to the next processing step for TC issuance.

The processing in step 407 too is monitored in connection with the time. In the case where no signature acquisition is detected in a fixed time, the operator is urged to apply a signature by giving a voice guidance such as "PLEASE COMPLETE SIGNATURE" (step 408). In the case where the completion of the signature acquisition processing is determined with the signature acquisition detected and with the enter key depressed, the other transaction information is printed on the paper journal by the print section 7. The paper journal of a length corresponding to one time of transaction is taken up by the signed paper journal take-up section 22 and the shutter 25 is closed.

Next, the details of a processing in the automatic transaction apparatus 11 will be explained using a flow chart shown in FIG. 8.

Though not shown, the automatic transaction apparatus for TC advances an automatic TC issuing process which includes the display of the exchange rate of the dollar, the kind of TC, the input of the amount of money, a guidance of a processing for the settlement of transaction sum inclusive of a commission, and so on.

The exchange rate of the dollar is stored in the storage section 6 in a form of contents transmitted from the upper or host device at every fixed period of time.

The control section includes:

a rewrite counter (l) for counting the number of times of rewriting of signature;

a clerk wait flag which is set in the case where the need of a processing by a clerk in charge is determined;

a signature wait counter (n) for counting the number of times of activation of a signature wait timer; and an acknowledge wait counter (m) for counting the number of times of activation of an acknowledge wait timer.

The timer includes:

the signature wait timer used for monitoring a time until the start of a signature; and the acknowledge wait timer used for monitoring a time from the detection of signature start to the depression of the enter key.

When a step requiring a signature acquisition processing is to be taken, the rewrite counter is initialized in order to reset the record of a processing performed by the preceding person (step 801) and the clerk wait flag is turned OFF (step 802). Next, a signature application guidance 91 for the signature acquisition processing is displayed on a display screen (step 803). An example of the display of the guidance is shown by 91 in FIG. 7A. In the present embodiment, the illustrations 93 and 94 shown in FIGS. 7C and 7D are alternately and repeatedly displayed in the illustration display portion. While the guidance is displayed, a guidance is given by a voice to conduct the operator for a signature application processing (steps 804 and 805). Next, the shutter mechanism 25 of the signature acquisition mechanism 3 is opened (step 806), the signature wait counter is set to 1 (step 807) and the signature wait timer is set (step 808).

When the application of a signature is started, the push plate 23' of the signature acquisition mechanism is lowered and the arm 28 is raised through the link connected the push plate 23' in accordance with the movement of the push plate 23' so that the signature acknowledge sensor 27 is turned on. If the start of signature application is determined by the turn-on of the signature acknowledge sensor (step 809), the acknowledge wait counter is set to 1 (step 810) and the acknowledge wait timer is set (step 811). When the enter key is depressed (step 812), the enter key is once erased from the display screen (step 813) and the completion of signature application is confirmed (step 814). Specifically, the confirmation of the completion of signature application includes raising the push plate 23' to return it to the original position and counting about two seconds by use of the timer 9. If the push plate 23' is in the raised state for that time, the completion of signature application is determined. When the completion of signature application is determined, the shutter is closed (step 815) and the other transaction information is printed on the paper journal. The paper journal of a length corresponding to one time of transaction is taken up by the signed paper journal take-up section 22. In the case where a clerk in charge such as a bank clerk performs a processing in the course of the above processings (step 827, step 851 and so on which will be mentioned later on), the monitor device 13 is in a clerk call condition. Therefore, the monitor device 13 is released from the clerk call condition (step 816) to take an advancement to the next processing of the TC issuing process.

If the push plate 23' is lowered during the counting of about two seconds in step 814, it is determined that the signature is being applied and the depression of the enter key is an erroneous operation (step 814). In such a case, the signature application guidance 91 is displayed on the display screen again (step 817) and a voice guidance such as "PLEASE PRESS ENTER KEY" is given (step 818) so that the operator is urged to apply the signature, thereby taking a wait for the depression of the enter key again.

If the enter key is not pressed in step 819 and a rewrite key is depressed (step 819), the rewrite key is once erased from the display screen (step 820) and the judgement as to whether or not the signature application is completed is made in a method similar to that in step 814 in order to cancel the erroneous operation of the rewrite key (step 821). In the case where it is determined that the signature is not being applied, the shutter is closed (step 822). The judgement is made as to whether or not the rewrite counter is not larger than 2 (step 823). In the case where the rewrite counter is not larger than 2, the counter is incremented (step 824) and a guidance 92 indicating that the paper is being fed (see FIG. 7b) is displayed (step 825). After the paper journal is taken up by a length corresponding to one time of transaction, the shutter is opened and the flow returns to step 803 by displaying the signature application guidance 91 on the display screen again to take a wait for the signature application.

In the case where it is determined in step 823 that the rewrite counter is larger than 2, the judgement is made as to whether or not the clerk wait flag is in an ON condition and a clerk key is in an ON condition (that is, a state in which a clerk in charge is operating the clerk key to perform a clerk's processing) (step 826). If the clerk wait flag is in an ON condition and the clerk key is in an ON condition, the clerk's processing is being performed and hence a paper feed processing is performed without taking the counter into consideration (step 825). If the judgement in step 826 is negative, it is determined that the operator has no understanding of the operation or there results from a mischief. In this case, the apparatus is once turned into a stopped condition and a clerk in charge is called upon by the monitor device (step 827). And, in order to perform a clerk's processing, the signature application guidance 91 is displayed on the display screen again (step 828), the shutter is opened (step 829) and the clerk wait flag is turned ON (step 830), thereby taking a wait for the depression of the enter key.

In the case where it is determined in step 821 that the signature is being applied, the depression of the rewrite key is regarded as being an erroneous operation and the signature application guidance 91 is displayed on the display screen again (step 831), thereby taking a wait for the depression of the enter key.

In the case where it is determined in step 812 that the enter key is not depressed and it is determined in step 819 that the rewrite key is not pressed, the judgement similar to that in step 826 is made as to whether or not the clerk wait flag is in an ON condition and the clerk key is in an ON condition (step 832). If the judgement in step 832 is affirmative, a clerk's processing can be regarded as being performed and hence a wait for the depression of the enter key is had without taking the acknowledge wait timer into consideration. If the judgement in step 832 is negative, the judgement is made as to whether or not the acknowledge wait timer is in time-out, that is, the acknowledge wait timer has a lapse of 20 seconds since it has been set in step 811 (step 833). In the case of time-out, the judgement is made as to whether or not the number of time of retrial is the fifth (step 834). If the retrial is the fifth one, the key being displayed is once erased (step 835) and the judgement of whether or not the signature is being applied is made similarly to step 814 (step 836). In the case where it is determined in step 836 that the signature is not being applied, it is determined that the operator has no understanding of the operation or there results from a mischief. In this case, the shutter is closed (step 837) and the apparatus is once turned into a stopped condition to call upon a clerk in charge by the monitor device (step 827). And, in order to perform a clerk's processing, the signature application guidance 91 is displayed on the display screen again (step 828), the shutter is opened (step 829) and the clerk wait flag is turned ON (step 830), thereby taking a wait for the depression of the enter key.

In the case where it is determined in step 836 that the signature is being applied, the signature application guidance 91 is displayed on the display screen again (step 838), thereby taking a wait for the depression of the enter key.

In the case where it is determined in step 834 that the retrial is not the fifth one, the acknowledge wait counter is incremented (step 839) and a voice guidance such as "PLEASE PRESS ENTER KEY" is given (step 840), thereby taking a wait for the depression of the enter key again.

In the case where the start of signature application is not detected in step 809 and the enter key is depressed in step 841, a voice guidance such as "PLEASE PRESS ENTER KEY" is given (step 842), thereby taking a wait for the start of signature application.

In the case where the rewrite key is depressed notwithstanding that the start of signature application is not detected (step 843), a voice guidance such as "PLEASE APPLY SIGNATURE" is given (step 844) to take a wait for the start of signature application, thereby preventing the unsigned paper from being wastefully taken up due to a mischief or erroneous operation.

If the keys are not pressed in steps 841 and 843 with the start of signature application being not detected in step 809, the judgement similar to that in step 826 or 832 is made as to whether or not the clerk wait flag is in an ON condition and the clerk key is in an ON condition (step 845). In the case where the judgement in step 845 is affirmative, a clerk's processing is regarded as being performed and hence a wait for the start of signature application is had without taking the signature wait timer into consideration. If the judgement in step 845 is negative, the judgement is made as to whether or not the signature wait timer is in time-out (step 846) and the judgement is made as to whether or not the number of time of retrial is the third (step 847). In the case where it is determined in step 846 that the signature wait timer is in time-out and it is determined in step 847 that the retrial is the third one, the key being displayed is once erased (step 848) and the judgement of whether or not the signature is being applied is made in a method similar to that in step 814 (step 849). In the case where it is determined in step 849 that the signature is not being applied, it is determined that the operator has no understanding of the operation or there results from a mischief. In this case, the shutter is closed (step 850) and the apparatus is once turned into a stopped condition to call upon a clerk in charge by the monitor device (step 851). And, in order to perform a clerk's processing, the clerk wait flag is turned ON (step 852) and the signature application guidance 91 is displayed on the display screen again (step 853).

In the case where it is determined in step 849 that the signature is being applied, the signature application guidance 91 is displayed on the display screen again (step 854), thereby taking a wait for the depression of the enter key.

In the case where it is determined in step 847 that the retrial is not the third one, the signature wait counter is incremented (step 855) and a voice guidance such as "PLEASE APPLY SIGNATURE" is given (step 856), thereby taking a wait for the start of signature application again. If it is determined in step 846 that the signature wait timer is not in time-out, the flow returns to step 809 to wait for the start of signature application.

According to the present embodiment as mentioned above, when a processing for acquisition of a signature or the like is to be performed at the time of purchase of TC, an advancement to the next processing is not taken unless both the acquisition of a signature and the depression of an enter key by a user are detected. Therefore, the forgetting of acquisition of a signature is eliminated and it becomes possible to perform an operation necessary for a TC issuing process by only an operator (or customer). Accordingly, it is possible to fully atomize the TC issuing process.

What is claimed is:

1. An automatic transaction apparatus for processing a check issuance transaction requiring the acquisition of a signature of an operator, comprising:

signature acquiring means for acquiring a signature of an operator, the signature acquiring means including a recording medium for recording a signature thereon, means for supplying said recording medium and means for receiving said recording medium after the signature has been acquired;

detecting means for detecting an execution of an operation to said signature acquiring means;

printing means for printing information generated by the transaction process; and control means for advancing a transaction process in accordance with a predetermined procedure so that at a time of the acquiring the signature of an operator, an advancement to a next processing step including check issuance is only taken under a condition that an execution of the acquiring the signature of an operation to said signature acquiring means is detected by said detecting means, the control means including means for causing said printing means to print transaction information other than the signature on said recording medium so that the signature and the transaction information other than the signature are recorded together as transaction information.

2. The automatic transaction apparatus according to claim 1, further comprising input means for inputting a completion of signature application and wherein said control means takes, at the time of the acquiring the signature of an operator, the advancement to the next processing step under a condition that the execution of the acquiring the signature of an operator is detected by said detecting means and the completion of signature application is inputted from said input means.

3. The automatic transaction apparatus according to claim 2, further comprising displaying means for displaying a guidance which conducts an operator for an operation to be performed by the operator, and time monitoring means for monitoring the time, wherein said control means includes means for causing said time monitoring means to monitor the time upon reception of a detection signal from said detecting means and causing said displaying means to make a display for urging an input of information indicative of a completion of signature acquiring when the completion of the signature acquiring is not inputted from said input means, notwithstanding that a fixed time has lapsed.

4. The automatic transaction apparatus according to claim 3, further comprising voice generating means for generating a voice output and wherein said control means includes means for urging the input of information indicative of the completion of signature application by the voice output.

5. An automatic transaction apparatus according to claim 2, further comprising displaying means for displaying a guidance which conducts an operator for an operation to be performed by the operator and wherein as the time of the signature acquiring said control means uses said displaying means to conduct the operator to apply a signature when the input of information indicative of the completion of signature acquiring from said input means is received before a detection signal from said detecting means is received.

6. The automatic transaction apparatus according to claim 2, further comprising voice generating means for displaying a guidance which conducts an operator for an operation to be performed by the operator and wherein as the time of the signature acquiring, said control means uses said voice generating means to conduct the operator to apply a signature in the case where the input of information indicative of the completion of signature acquiring from said input means is received before a detection signal from said detecting means is received.

7. The automatic transaction apparatus according to claim 1, wherein said detecting means includes means for detecting a depression pressure against said signature acquiring means at the time of signature application.

8. The automatic transaction apparatus according to claim 1, wherein said detecting means includes a light sensor.

9. An automatic transaction apparatus for processing a check issuance transaction requiring the acquisition of a signature of an operator comprising:

signature acquiring means for acquiring a signature of an operator;

detecting means for detecting an execution of an operation of said signature acquiring means;

control means for advancing a transaction process in accordance with a predetermined procedure so that at a time of the acquiring the signature of said operator, an advancement to a next processing step including check issuance is taken only under a condition that an execution of the acquiring the signature of an operator to said signature acquiring means is detected by said detecting means; and printing means for printing information generated by the transaction process, and wherein said signature acquiring means includes a recording medium for recording a signature thereon, means for supplying said recording medium and means for receiving said recording medium after the signature has been acquired and said control means causes said printing means to print transaction information other than the signature on said recording medium so that the signature and the transaction information other than the signature are together recorded as transaction information.

10. The automatic transaction apparatus according to claim 9, wherein said control means includes means, in the case where the input of information indicative of the rewriting of a signature from said input means is received, for transporting said recording medium so that a signature can be newly applied.

11. The automatic transaction apparatus according to claim 9, further comprising input means for inputting a completion of signature application and wherein said control means includes means for, at a time of the signature acquiring, advancing the apparatus to the next processing step under the condition that the execution of the signature acquiring is detected by said detecting means and the completion of signature application is inputted from said input means.

12. A transaction information recording method in an automatic check issuance transaction apparatus which takes a check issuance transaction requiring an acquisition of a signature of an operator, wherein the apparatus includes means for inputting information necessary for a transaction process, displaying means for conducting an operation to be performed by an operator and signature acquiring means for recording the signature of the operator, comprising the steps of:

advancing the transaction process in accordance with a predetermined procedure;

monitoring, when a signature acquisition processing is to be performed, whether or not an operation to said signature acquiring means is executed and whether or not an input of acknowledge information indicative of a completion of the signature acquisition processing is present;

conducting the operator to apply a signature in the case where the input of said acknowledge information is not detected with the execution of the operation to said signature acquiring means;

urging the operator to input the acknowledge information in a case where the input of said acknowledge information is not made after a lapse of a fixed time after the execution of the operation to said signature acquiring means has been detected; and leaving as a transaction information record the signature together with information for specifying a transaction subjected to signature application in the case where both the operation to said signature acquiring means and the input of said acknowledge information are made.

13. The transaction information recording method according to claim 12, wherein after the detection of both the execution of the operation to said signature acquiring means and the input of said acknowledge information, the execution of the operation to said signature acquiring means is monitored again so that when no operation is performed for fixed time, an advancement to the next processing including check issuance is taken regarding the signature acquisition processing as being completed.

14. The transaction information recording method according to claim 12, wherein a time until the operation to said signature acquiring means is performed is monitored at the time of start of the signature acquiring so that the transaction process is stopped to make a communication to monitor device when the operation to said signature acquiring means is not performed after a lapse of a fixed time.

15. The automatic transaction apparatus for taking a check issuance transaction recruiting an acquisition of a signature, comprising:

signature acquiring means for acquiring a signature of an operator on a recording medium other than on a check to be issued, the signature acquiring means including a recording medium for recording the signature thereon, means for supplying said recording medium, and means for receiving said recording medium after the signature has been acquired;

detecting means for detecting whether a signature operation to said signature acquiring means is executed;

control means for advancing a transaction process in accordance with a predetermined procedure so that at a time of a signature acquisition processing, an advancement to a next processing step including check issuance is taken under a condition that the execution of the signature acquiring to said signature acquiring means is detected by said detecting means; and, printing means for printing information generated by the transaction process, wherein said control means includes means for causing said printing means to print transaction information other than the signature on said recording medium so that the signature and the transaction information other than the signature are together recorded as transaction information.

16. The automatic transaction apparatus according to claim 15, further comprising input means for inputting a completion of signature application and wherein said control means includes means for advancing the apparatus, at a time of the signature acquiring, to the next processing step under the condition that the execution of the signature acquiring is detected by said detecting means and the completion of signature application in inputted from said input means.

* * * * *